(12) United States Patent
O'Neill

(10) Patent No.: US 9,650,091 B2
(45) Date of Patent: May 16, 2017

(54) CRAWLER TRACK

(71) Applicant: Joy MM Delaware, Inc., Wilmington, DE (US)

(72) Inventor: Michael L. O'Neill, Lucinda, PA (US)

(73) Assignee: Joy MM Delaware, Inc., Wilmington, DE (US)

( * ) Notice: Subject to any disclaimer, the term of this patent is extended or adjusted under 35 U.S.C. 154(b) by 913 days.

(21) Appl. No.: 13/901,899

(22) Filed: May 24, 2013

(65) Prior Publication Data

US 2013/0313891 A1 Nov. 28, 2013

Related U.S. Application Data

(60) Provisional application No. 61/651,761, filed on May 25, 2012.

(51) Int. Cl.
*B62D 55/20* (2006.01)
*B62D 55/26* (2006.01)
*E21C 29/22* (2006.01)

(52) U.S. Cl.
CPC ........... *B62D 55/202* (2013.01); *B62D 55/26* (2013.01); *E21C 29/22* (2013.01)

(58) Field of Classification Search
CPC .............................. B62D 55/202; B62D 55/26
USPC ....... 305/191, 192, 201, 160, 162, 185, 198, 305/53
See application file for complete search history.

(56) References Cited

U.S. PATENT DOCUMENTS

| 1,512,152 A | * | 10/1924 | White | B62D 55/08 305/122 |
|---|---|---|---|---|
| 3,355,225 A | | 11/1967 | McDowell et al. | |
| 3,717,387 A | | 2/1973 | Cackley et al. | |
| 3,764,185 A | | 10/1973 | Symmank | |
| 3,857,617 A | | 12/1974 | Grawley | |
| 3,913,986 A | * | 10/1975 | Schaffner | B62D 55/20 305/187 |
| 4,043,610 A | | 8/1977 | Halmosi et al. | |
| 4,108,229 A | | 8/1978 | Herman | |
| 4,865,400 A | | 9/1989 | Caron et al. | |

(Continued)

FOREIGN PATENT DOCUMENTS

CN 102431601 5/2012
JP 2001310776 11/2001

*Primary Examiner* — S. Joseph Morano
*Assistant Examiner* — Jean Charleston
(74) *Attorney, Agent, or Firm* — Michael Best & Friedrich LLP

(57) ABSTRACT

A crawler track includes a link and is driven in a direction of travel by a sprocket having a plurality of teeth. The link includes a pad, a first grouser, and a second grouser. The pad defines a first surface, a second surface opposite the first surface, a first end, and a second end spaced apart from the first end along the direction of travel. The pad defines at least one opening extending through the pad between the first surface and the second surface, and the opening is operable to receive a sprocket tooth. The first grouser is positioned on the first surface proximate the first end of the pad, while the second grouser is positioned on the first surface proximate the second end of the pad. The first grouser and the second grouser extend in a direction substantially perpendicular to the direction of travel of the track.

19 Claims, 7 Drawing Sheets

(56) References Cited

U.S. PATENT DOCUMENTS

| | | | | |
|---|---|---|---|---|
| 5,165,766 A | * | 11/1992 | Thomas | B65G 19/24 |
| | | | | 198/731 |
| 5,186,526 A | * | 2/1993 | Pennington | B65G 41/008 |
| | | | | 198/731 |
| 5,482,365 A | * | 1/1996 | Peterson | B62D 55/275 |
| | | | | 305/197 |
| 5,547,268 A | * | 8/1996 | Hansen | B62D 55/02 |
| | | | | 305/191 |
| 5,713,645 A | | 2/1998 | Thompson et al. | |
| 6,575,540 B2 | * | 6/2003 | Soucy | B62D 55/24 |
| | | | | 305/165 |
| 7,066,562 B2 | | 6/2006 | Rasmussen | |
| 7,854,483 B2 | | 12/2010 | Bordini | |
| 9,102,370 B2 | * | 8/2015 | Freeman | B62D 55/075 |

\* cited by examiner

CRAWLER TRACK

RELATED APPLICATIONS

This application claims the benefit of prior-filed, U.S. Provisional Application No. 61/651,761, filed May 25, 2012, the entire contents of which are hereby incorporated by reference.

FIELD

The present invention relates to mining machines and, in particular, to a track for a crawler-type mining machine.

SUMMARY

Crawler tracks for mining machines typically incorporate unitary links connected in a continuous chain. Crawler tracks for many types of heavy machinery typically include an outer shoe that is supported on a chain driven by a sprocket. These chains are typically thick, increasing the overall height of the machine. In underground mining applications, the track is formed of unitary links, each including a ground-engaging portion formed integrally with the link. The chain link is essentially a flat pad with journal lugs at the front and rear edges. The journal lugs receive connecting pins to join the links and transfer the force of propelling the mining machine. The pad includes at least one rectangular slot extending through the link from a top side to a bottom side. The slot receives sprocket teeth to transfer force from a driving sprocket to the chain. The pad also includes one or more cleats or grousers that penetrate the ground to provide traction. The grousers may be arranged parallel to the chain pins or may be angled to form a chevron pattern, depending on the conditions of the mine floor. If the mine floor is hard or if the grousers form a large outer surface area for engaging the ground, the grousers do not penetrate to their full depth and the weight of the machine is transferred through the grousers to the floor. The links typically are arranged in an alternating pattern such that pads having straight grousers alternate with pads having chevron grousers.

The presence of the slots for the sprocket teeth limits how the grousers may be arranged on the pad because there is insufficient space to position the straight grousers between the slots. Typically, the full length of the straight grousers must be positioned along one edge of the pad. This is problematic because the weight of the machine is not evenly distributed but rather is concentrated on the one edge of the pad. This concentration causes high contact stress between the pad and the runners of the machine where the pad contacts and accelerates wear on the straight grouser pads, particularly in the area near the straight grousers. Likewise, the pin and journal lug connection that is proximate the high-wear end of the pad transfers force to the adjacent pad having a chevron grouser, accelerating wear on the adjacent pad. The accelerated wear may weaken the grousers, the pads, the journal lugs, etc., and failure of the links requires significant amount of time to repair the chain.

In one independent embodiment, a link for a track for a mining machine is provided. The track is driven in a direction of travel by a sprocket to move the mining machine over a support surface. The sprocket has a plurality of teeth. The link includes a pad, a first grouser, and a second grouser. The pad defines a first surface engaging the support surface, a second surface opposite the first surface, a first end, and a second end spaced apart from the first end along the direction of travel. The pad defines at least one opening extending through the pad between the first surface and the second surface, and the opening is operable to receive a sprocket tooth. The first grouser is positioned on the first surface proximate the first end of the pad. The first grouser extends in direction substantially perpendicular to the direction of travel of the track. The second grouser is positioned on the first surface proximate the second end of the pad. The second grouser extends in a direction substantially perpendicular to the direction of travel of the track.

In another independent embodiment, a crawler mechanism for moving a mining machine along the ground is provided. The crawler mechanism includes a frame, a sprocket, and a track driven by the sprocket. The sprocket includes a drum and a plurality of teeth positioned along an outer surface of and extending radially outwardly from the drum. A portion of the track engages the ground and moves in a direction of travel. The track includes a plurality of links, and at least one of the plurality of links includes a pad, a first grouser, and a second grouser. The pad defines a first end, a second end opposite the first end, a first surface extending between the first end and the second end and adapted to engage the ground, and a second surface opposite the first surface and extending between the first end and the second end. The pad defines at least one opening extending through the pad between the first surface and the second surface, and the at least one opening is operable to receive a sprocket tooth. The first grouser is positioned on the first surface proximate the first end. The first grouser extends in direction substantially perpendicular to the direction of travel. The second grouser is positioned on the first surface proximate the second end. The second grouser extends in a direction substantially perpendicular to the direction of travel.

In yet another independent embodiment, a crawler mechanism for moving a mining machine along the ground is provided. The crawler mechanism includes a frame, a sprocket, and a track driven by the sprocket. The sprocket includes a drum and a plurality of teeth positioned along an outer surface of and extending radially outwardly from the drum. A portion of the track engages the ground and moves in a direction of travel. The track includes a first link and a second link. The first link includes a first pad, a first grouser and a second grouser. The first pad defines a first end, a second end opposite the first end, an outer surface engaging the ground, and an inner surface opposite the outer surface. The first pad defines at least one opening extending through the first pad between the inner surface and the outer surface, and the opening is operable to receive a sprocket tooth. The first grouser is positioned on the outer surface proximate the first end and extends in direction substantially perpendicular to the direction of travel. The second grouser is positioned on the outer surface proximate the second end and extends in a direction substantially perpendicular to the direction of travel. The second link includes a second pad, a first grouser, and a second grouser. The second pad defines a first end, a second end opposite the first end, an outer surface engaging the ground, and an inner surface opposite the outer surface. The second pad includes at least one opening extending through the pad between the inner surface and the outer surface. The opening being operable to receive a sprocket tooth. The first grouser is positioned on the outer surface and oriented to form an acute angle relative to the direction of travel. The second grouser is positioned on the outer surface and oriented to form an acute angle relative to the direction of travel.

Other independent aspects of the invention will become apparent by consideration of the detailed description and accompanying drawings.

DETAILED DESCRIPTION

Figure 1:
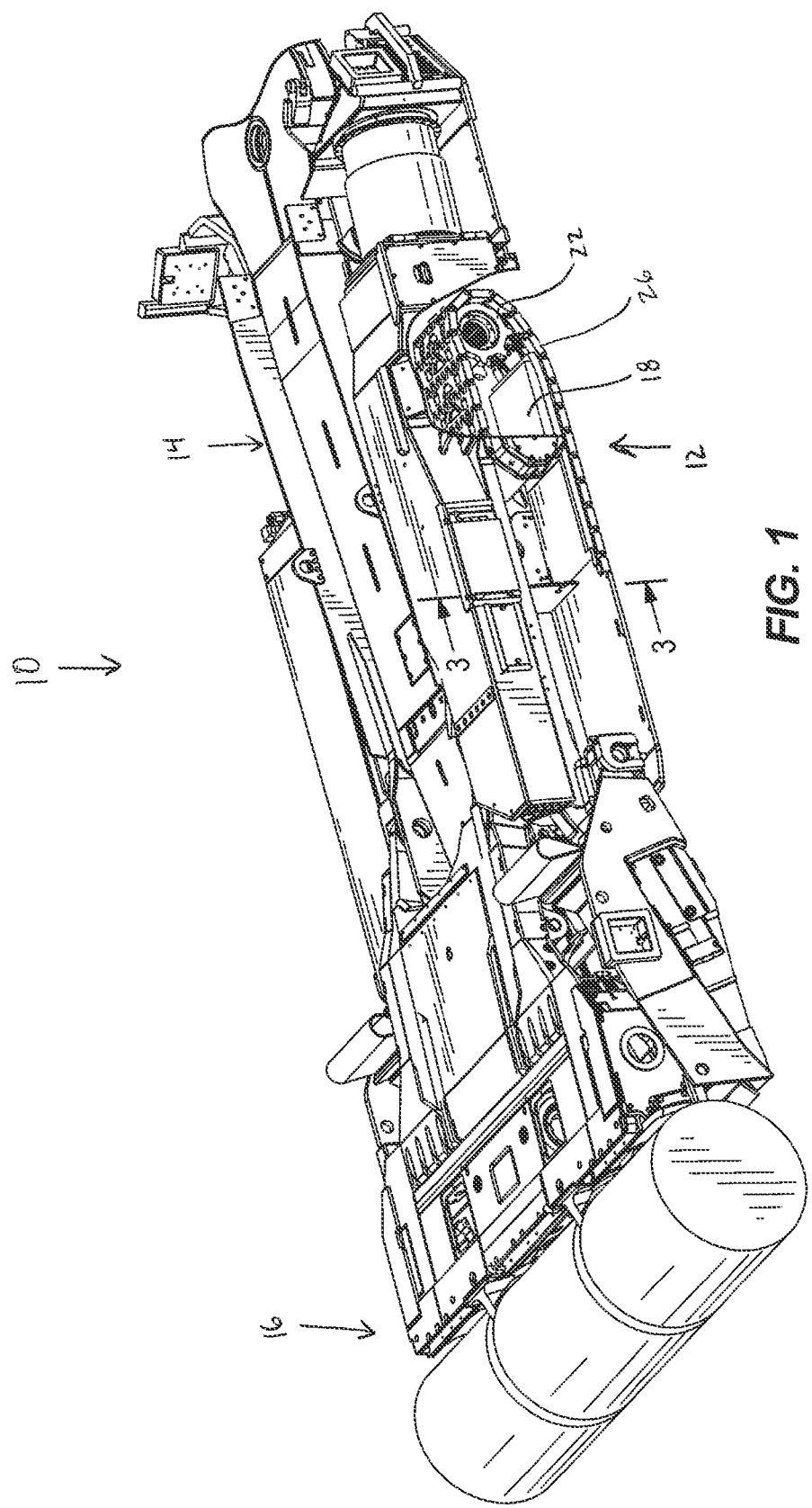
FIG. 1 is a perspective view of a mining machine including a crawler mechanism.

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways. Also, it is to be understood that the phraseology and terminology used herein is for the purpose of description and should not be regarded as limiting. The use of "including," "comprising" or "having" and variations thereof is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. As described in subsequent paragraphs, the specific configurations illustrated in the drawings are intended to exemplify independent embodiments of the invention, and other alternative configurations are possible.

FIG. 1 illustrates a mining machine, such as a continuous miner 10, including a crawler mechanism 12 for moving the machine 10 over a support surface or ground. In the illustrated embodiment, the continuous miner 10 includes a frame 14 and a cutting head 16 coupled to the frame 14. In other embodiments, the crawler mechanism 12 may be incorporated on a mining machine other than a continuous miner. The crawler mechanism 12 includes a frame 18, a sprocket 22, and a continuous track 26.

Figure 2:
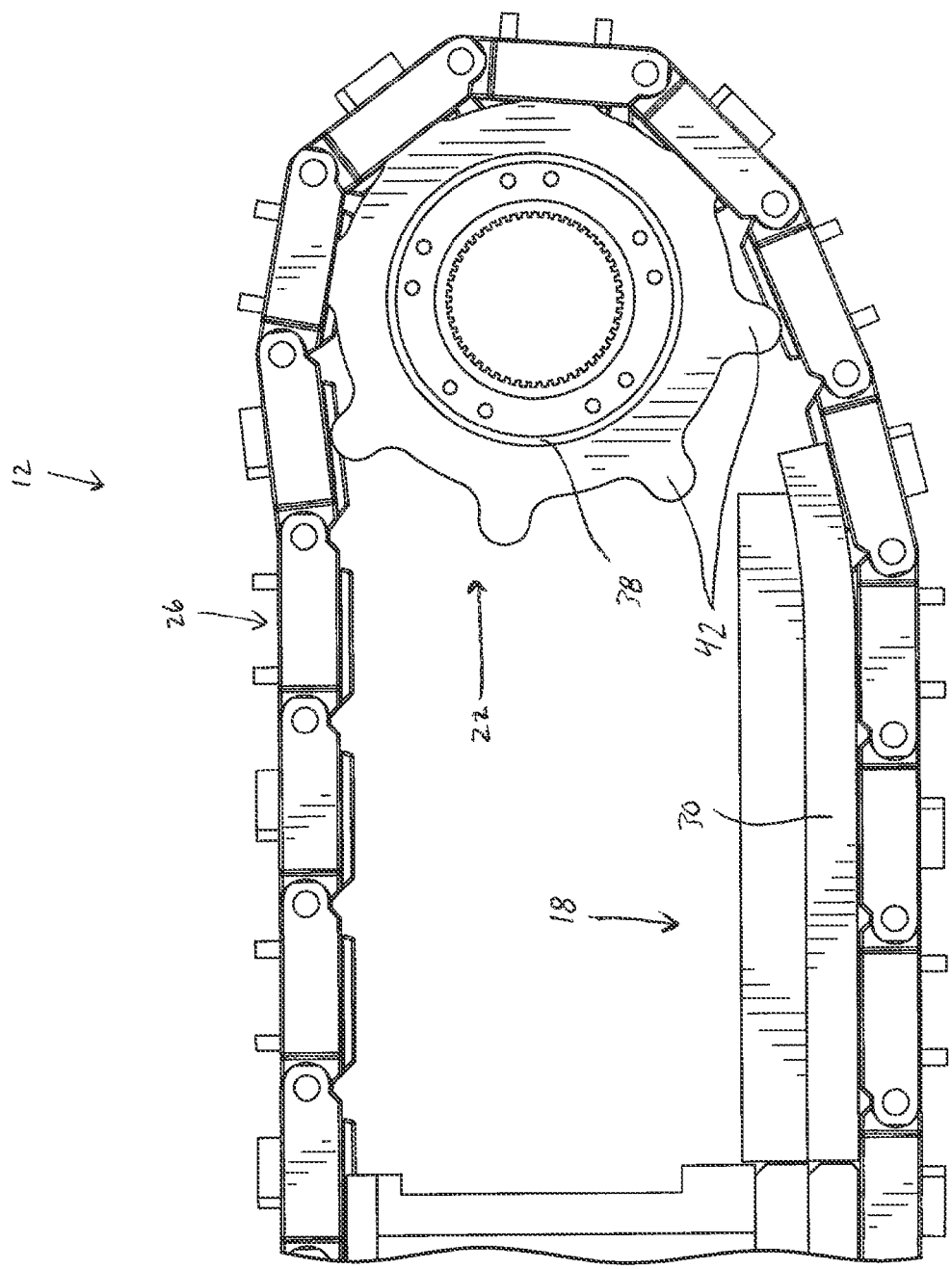
FIG. 2 is a side view of a portion of the crawler mechanism shown in FIG. 1.
Figure 3:
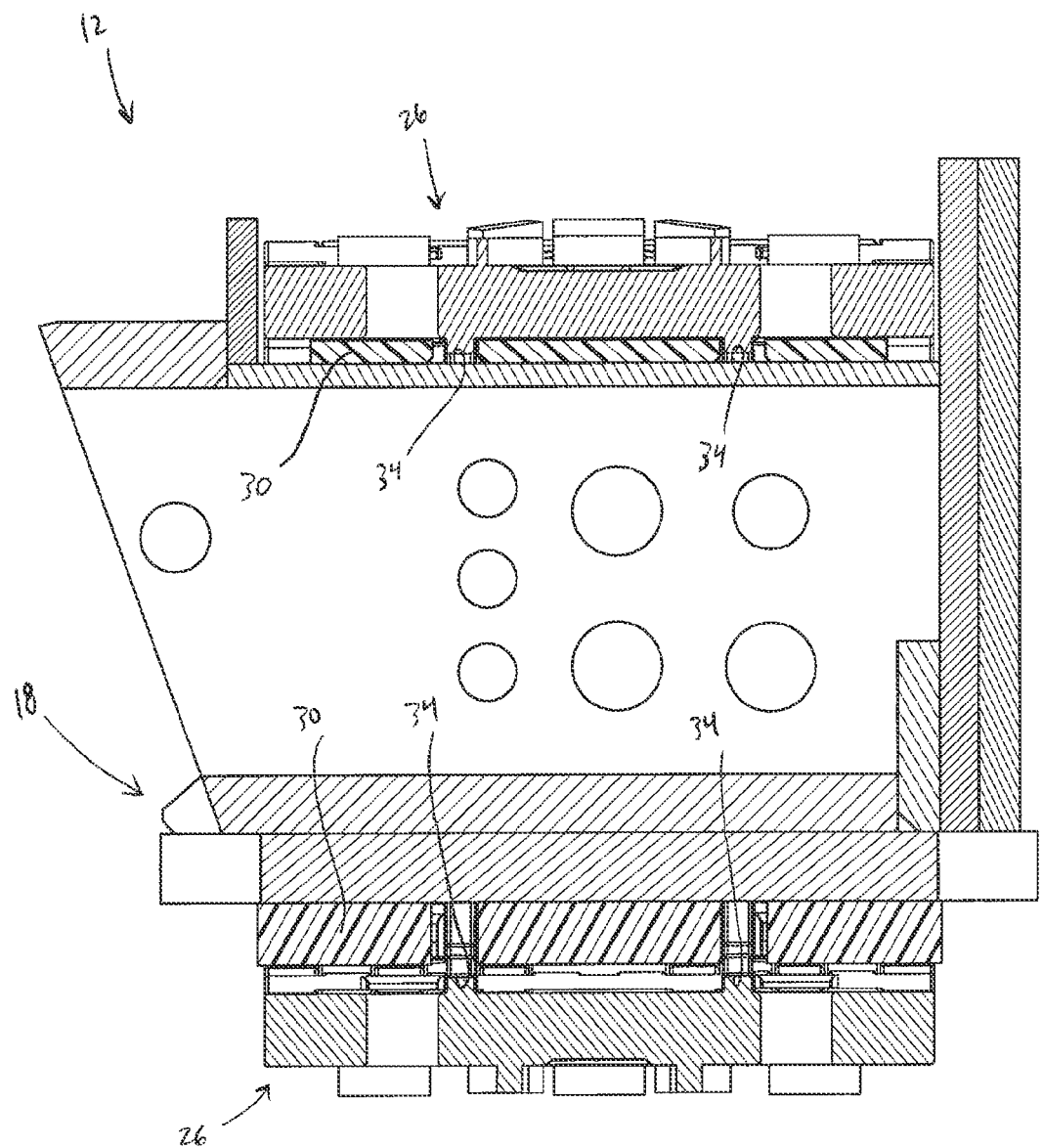
FIG. 3 is a section view of the crawler mechanism shown in FIG. 1 taken generally along line 3-3 in FIG. 1.

As shown in FIGS. 2 and 3, the frame 18 includes a runner 30 positioned adjacent a lower run of the track 26. The runner 30 includes slots 34 (FIG. 3) extending parallel to the track 26. As the track 26 is driven, the slots 34 guide and balance the weight of the mining machine on the track 26. The sprocket 22 (FIG. 2) is driven by a motor (not shown) and includes a drum 38 and multiple teeth 42 positioned circumferentially around the drum 38 for engaging the track 26. In the illustrated embodiment, the sprocket 22 includes two sets of teeth 42 spaced apart along the length of the drum 38. In other embodiments, the sprocket 22 may include fewer or more sets of teeth 42.

Figure 4:
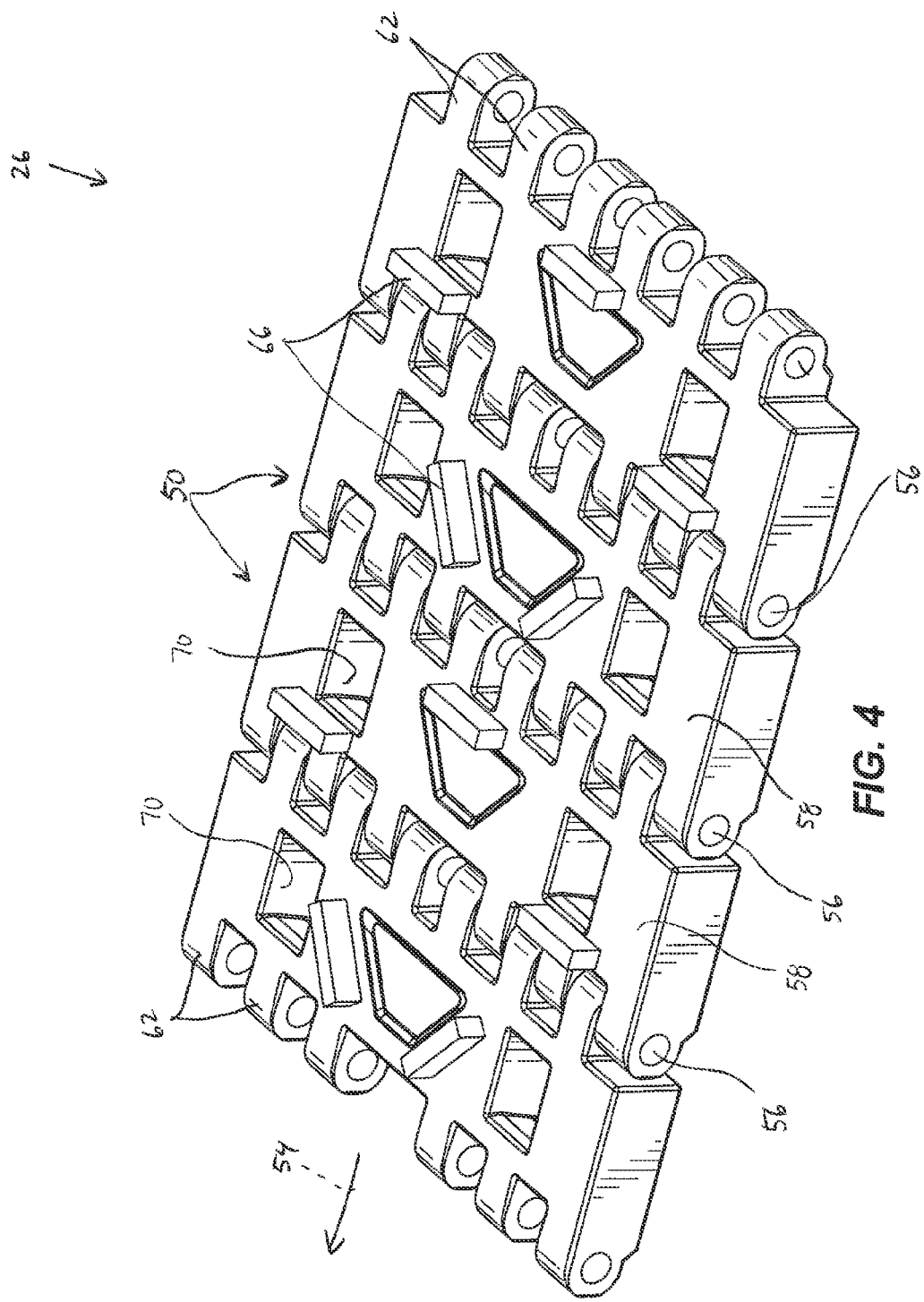
FIG. 4 is a perspective view of a portion of a track.
Figure 5:
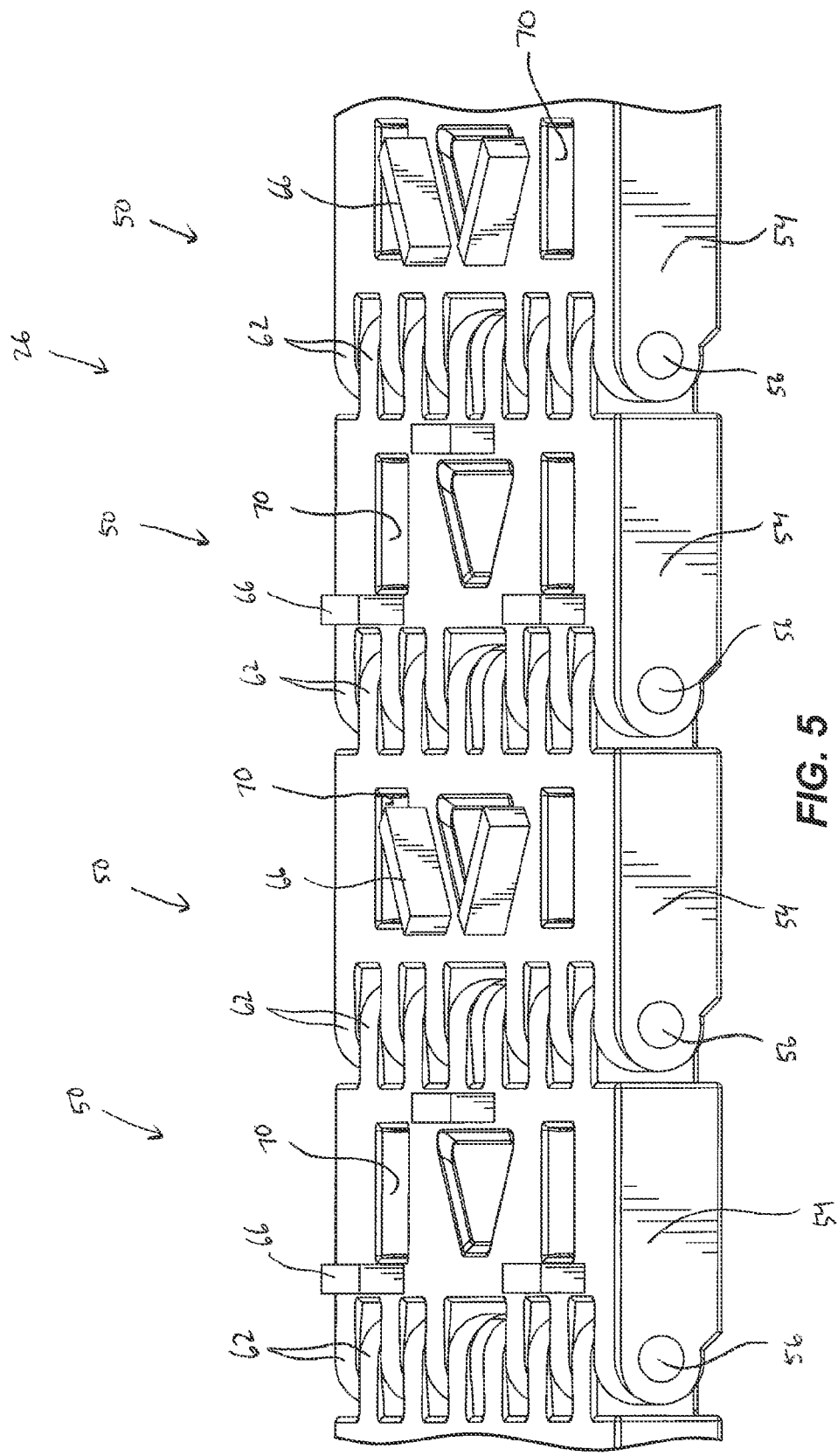
FIG. 5 is a side perspective view of the portion of the track shown in FIG. 4.
Figure 6:
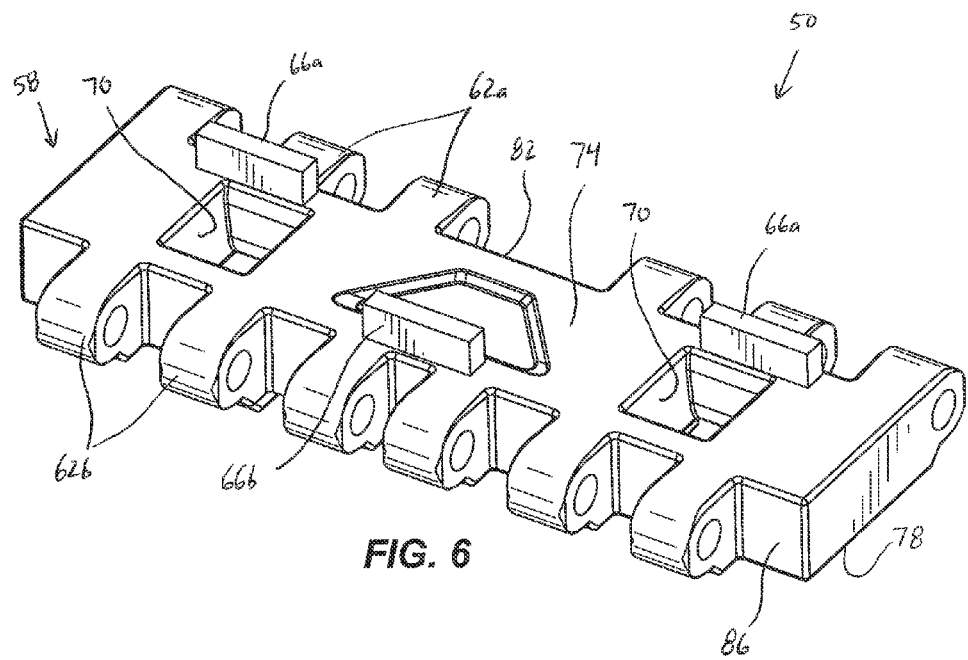
FIG. 6 is a perspective view of a link for a track, showing a ground-engaging surface.
Figure 7:
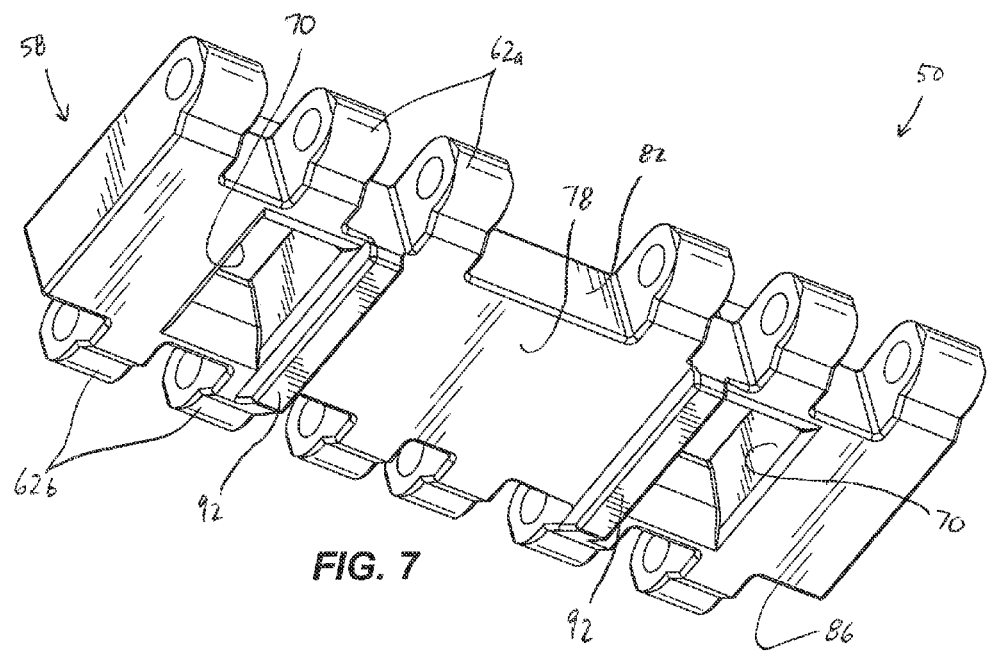
FIG. 7 is a perspective view of the link of FIG. 6, showing a support surface.
Figure 8:
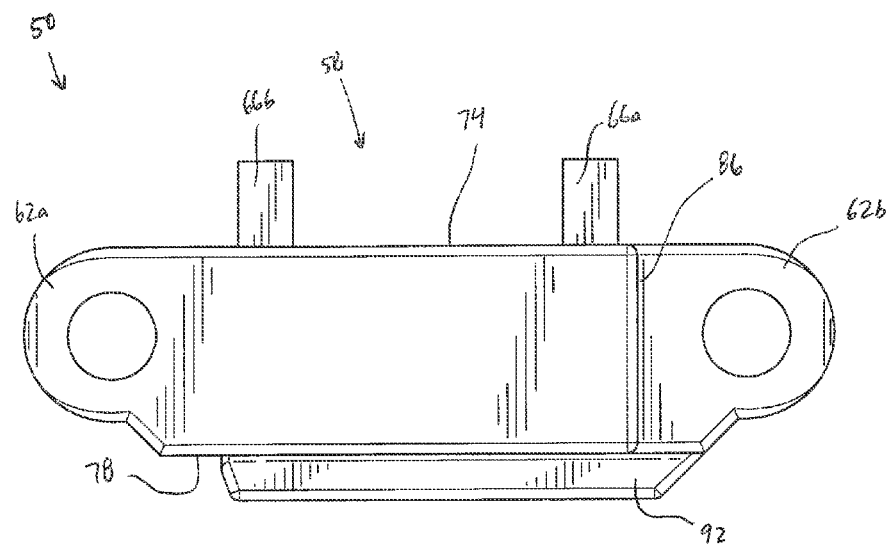
FIG. 8 is a side view of the link shown in FIG. 6.

Referring to FIGS. 4 and 5, the track 26 is formed of multiple links 50 coupled together. As the sprocket 22 (FIG. 2) drives the track 26, the links 50 travel along a direction of travel 54. The links 50 are coupled together by pins 56. Each link 50 includes a pad 58, multiple lugs 62, and multiple grousers 66. As shown in FIGS. 6 and 7, each pad 58 includes slots 70 for receiving the sprocket teeth 42, a ground-engaging surface 74, a support surface 78, a first end 82 and a second end 86. A first set of lugs 62a are positioned on the first end 82 of the pad 58, and a second set of lugs 62b are positioned on the second end 86 of the pad 58. The second set of lugs 62b is complementary to the first set of lugs 62a so that the first set of lugs 62a on one pad 58 can be aligned with the second set of lugs 62b on another pad 58. Adjacent pads 58 are coupled together by inserting the pin 56 (FIGS. 4 and 5) through the aligned lugs 62a, 62b. In the illustrated embodiment, the slots 70 are generally positioned between the first lugs 62a and the second lugs 62b. In other embodiments, the slots 70 may be positioned adjacent the side of the pad 58, outside of an area disposed between the lugs 62a and 62b. As shown in FIG. 7, the support surface 78 includes a pair of guides 92 that extend between the first end 82 and the second end 86 and engage the slots 34 (FIG. 3) on the runner 30.

As shown in FIGS. 6 and 7, the grousers 66 are coupled to the ground-engaging surface 74. The grousers 66 may be positioned in an orientation that is perpendicular to the direction of travel 54 (FIG. 4) (referred to as "straight" grousers 66), or may be oriented at an angle with respect to the direction of travel 54 (FIG. 4) (referred to as angled or "chevron" grousers).

The grousers 66 in the illustrated embodiment are formed integrally with the pad 58 and made from the same steel material as the pad 58. In other embodiments, the grousers 66 may be formed separately from and coupled to the pad 58 in another manner, such as, for example, by welding. In such other embodiments, the grousers 66 may be made from a variety of materials, including tungsten carbide or stainless steel. Each grouser 66 may be formed from two separate materials such as a lower portion adjacent the ground-engaging surface 74 composed of steel and an upper portion composed of tungsten carbide. In other embodiments, an outer surface of the grousers 66 may be coated with tungsten carbide in order to reduce wear on the grouser 66. In addition, the grousers 66 may be formed with similar dimensions and characteristics so that the size of an angled grouser 66 is the same as that of a straight grouser 66, reducing the number of different parts for the track 26.

In the illustrated embodiment, as the track 26 travels, the angled grousers 66 engage the mine floor such that the angled grousers 66 "point" toward the rear end of the machine; that is, the ends of the angled grousers 66 that are closest to a centerline of the pad 58 relative to the direction of travel 54 are closer to the rear of the mining machine than the ends of the angled grousers 66 that are farther away from the centerline. In the illustrated embodiment, the track 26 is formed in an alternating pattern such that links 50 having a straight grouser configuration alternate with links 50 having an angled grouser configuration. In other embodiments, the track 26 may be formed with a different pattern.

Referring to FIGS. 6 and 7, each straight grouser 66 includes a first grouser portion 66a adjacent the first end 82 of the pad 58, and a second grouser portion 66b adjacent the second end 86 of the pad 58. In the illustrated embodiment, the first portion 66a includes two grousers 66, and the second grouser portion 66b includes one grouser 66. The first portion grousers 66a are at least partially positioned between the slot 70 and the first end 82 of the pad 58. That is, the first portion grousers are aligned with the slots 70. In addition, a gap between the first portion grousers 66a is substantially aligned with the second portion grouser 66b. In other embodiments, additional grousers 66 could be positioned between the first end 82 and the second end 86 of the pad 58 and between the slots 70. In addition, the first portion 66a could overlap with the second portion 66b when viewed along the direction of travel 54 of the track 26. That is, a gap in the first portion 66a would be shorter than the length of the second portion 66b.

Figure 9:
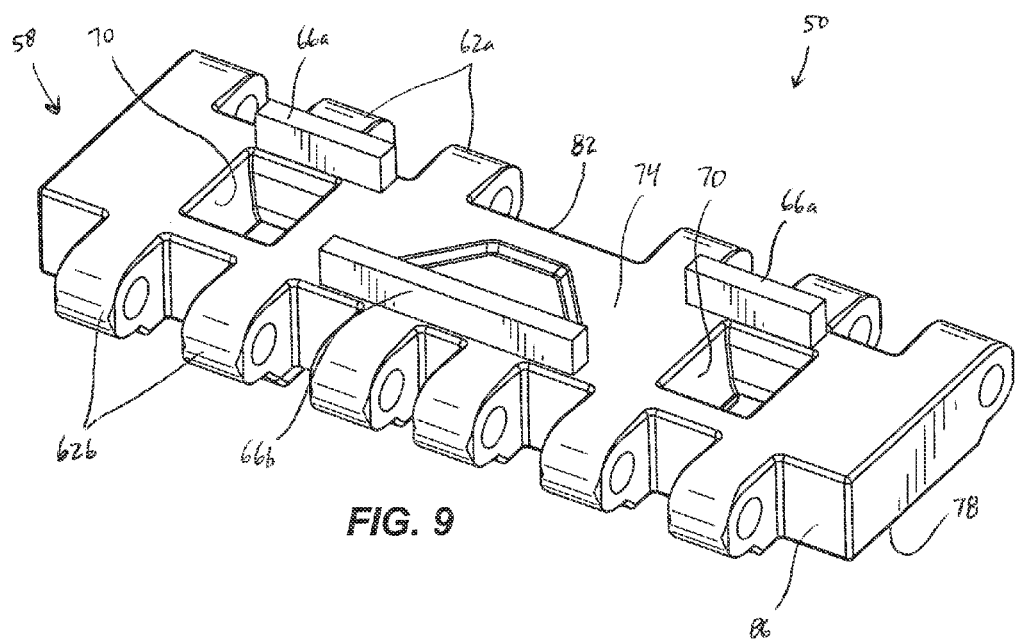
FIG. 9 is a perspective view of a link for a track according to another embodiment.

In the embodiment shown in FIG. 9, the total length of the grousers 66 of the first portion 66a is approximately equal to the total length of the grouser 66 of the second portion 66b. In some embodiments, the grousers 66 of the first grouser portion 66a are formed by halving a grouser 66 that is equal in length to the grouser 66 of the second portion 66b, thereby reducing the number of different parts for the track 26.

By positioning grousers 66 on both ends 82 and 86 of the pad 58, the weight of the mining machine is more evenly distributed along the length of the pad 58, which may reduce contact stresses between the track 26 and the runners 30 and/or wear on the grousers 66, the pad 58, and other components. In addition, the staggered positioning of the grousers 66a and 66b increases the surface area of the front of the grousers 66 that engage the ground without significantly increasing the outer surface area of the grousers 66, resulting in better penetration and engagement of the track 26 with the ground. Furthermore, because the illustrated grouser portions 66a and 66b have similar total lengths, similar parts can be used to form both portions 66a, 66b, reducing the number of different parts for the track 26.

Thus, the invention may provide, among other things, a crawler track including a pad having at least one grouser coupled to the pad proximate each end of the pad.

Although the invention has been described in detail with reference to certain independent embodiments, variations and modifications exist within the scope and spirit of one or more independent aspects of the invention as described.

The invention claimed is:

1. A crawler mechanism for moving a mining machine along the ground, the crawler mechanism comprising:
   a frame;
   a sprocket including a drum and a plurality of teeth positioned along an outer surface of and extending radially outwardly from the drum;
   a track driven by the sprocket, a portion of the track engaging the ground and moving in a direction of travel, the track including a plurality of links, at least one of the plurality of links including
      a pad defining a first end, a second end opposite the first end, a first surface extending between the first end and the second end and adapted to engage the ground, a second surface opposite the first surface and extending between the first end and the second end, the pad defining at least one opening extending through the pad between the first surface and the second surface, the at least one opening being operable to receive a sprocket tooth,
      a first grouser positioned on the first surface proximate the first end, the first grouser extending in direction substantially perpendicular to the direction of travel; and
      a second grouser positioned on the first surface proximate the second end, the second grouser extending in a direction substantially perpendicular to the direction of travel,
   wherein the frame includes a runner, and wherein the second surface of the pad is operable to directly engage the runner, and
   wherein the runner includes a slot and the second surface includes at least one guide engaging the slot, the slot and the guide extending in a direction parallel to the direction of travel.

2. The crawler mechanism of claim 1, wherein at least one of the first grouser and the second grouser is formed integrally with the pad.

3. The crawler mechanism of claim 1, wherein at least one of the first grouser and the second grouser is attached to the pad by welding.

4. The crawler mechanism of claim 1, wherein the pad includes a pair of openings extending through the pad, the openings being spaced apart laterally with respect to the direction of travel, each opening being operable to receive a sprocket tooth.

5. The crawler mechanism of claim 1, wherein the first grouser includes a first portion and a second portion laterally spaced apart from the first portion, a gap being defined between the first portion and the second portion.

6. The crawler mechanism of claim 5, wherein the second grouser is substantially aligned with the gap between the first portion and the second portion and spaced apart from the gap in a direction parallel to the direction of travel.

7. The crawler mechanism of claim 1, wherein at least one of the first grouser and the second grouser includes more than one grouser portions, the more than one grouser portions having a total length at least equal to a length of the other of the first grouser and the second grouser.

8. The crawler mechanism of claim 1, wherein the first grouser is at least partially aligned with the at least one opening in a direction parallel to the direction of travel.

9. The crawler mechanism of claim 1, further comprising:
   a first set of lugs extending away from the first end and of the pad adapted to receive a first pin and adapted to be coupled to a set of lugs of a link adjacent the first end; and
   a second set of lugs extending away from the second end of the pad and adapted to receive a second pin and adapted to be coupled to another set of lugs of another link adjacent the second end.

10. A crawler mechanism for moving a mining machine along the ground, the crawler mechanism comprising:
    a frame;
    a sprocket including a drum and a plurality of teeth positioned along an outer surface of and extending radially outwardly from the drum; and
    a track driven by the sprocket, a portion of the track engaging the ground and moving in a direction of travel, the track including
       a first link including
          a first pad defining a first end, a second end opposite the first end, an outer surface engaging the ground, and an inner surface opposite the outer surface, the first pad defining at least one opening extending through the first pad between the inner surface and the outer surface, the opening being operable to receive a sprocket tooth,
          a first grouser positioned on the outer surface proximate the first end and extending in direction substantially perpendicular to the direction of travel, and a second grouser positioned on the outer surface proximate the second end and extending in a direction substantially perpendicular to the direction of travel, and a second link including
a second pad defining a first end, a second end opposite the first end, an outer surface engaging the ground, and an inner surface opposite the outer surface, the second pad including at least one opening extending through the pad between the inner surface and the outer surface, the opening being operable to receive a sprocket tooth,
a first grouser positioned on the outer surface and oriented to form an acute angle relative to the direction of travel, and
a second grouser positioned on the outer surface and oriented to form an acute angle relative to the direction of travel, wherein the frame includes a runner, and wherein the inner surface of each of the first pad and the second pad is operable to directly engage the runner, and wherein the runner includes a slot and the inner surface of at least one of the first pad and the second pad includes a guide engaging the slot, the slot and the guide extending in a direction parallel to the direction of travel.

11. The crawler mechanism of claim 10, wherein the first grouser of the first link includes a first portion and a second portion laterally spaced apart from the first portion, a gap being defined between the first portion and the second portion.

12. The crawler mechanism of claim 11, wherein the second grouser of the first link is at least partially aligned with the gap and spaced apart from the gap in a direction parallel to the direction of travel.

13. The crawler mechanism of claim 10, wherein at least one of the first grouser and the second grouser of the first link includes more than one grouser portions, the more than one grouser portions having a total length at least equal to a length of the other of the first grouser and the second grouser.

14. The crawler mechanism of claim 10, wherein the first grouser of the first link is partially aligned with the at least one opening in a direction that is parallel to the direction of travel.

15. The crawler mechanism of claim 10, wherein the first grouser of the first link has a first length, and wherein the first grouser of the second link has a second length equal to the first length.

16. The crawler mechanism of claim 10, wherein at least one of the first grouser and the second grouser is formed integrally with the pad.

17. The crawler mechanism of claim 10, wherein at least one of the first grouser and the second grouser is attached to the pad by welding.

18. The crawler mechanism of claim 10, wherein the pad includes a pair of openings extending through the pad, the openings being spaced apart laterally with respect to the direction of travel, each opening being operable to receive a sprocket tooth.

19. The crawler mechanism of claim 10, further comprising: a first set of lugs extending away from the first end and of the pad adapted to receive a first pin and adapted to be coupled to a set of lugs of a link adjacent the first end; and a second set of lugs extending away from the second end of the pad and adapted to receive a second pin and adapted to be coupled to another set of lugs of another link adjacent the second end.

* * * * *